United States
Kemp

[11] 3,867,014
[5] Feb. 18, 1975

[54] SYMMETRIC BIREFRINGENCE MODULATOR

[76] Inventor: James C. Kemp, 2642 Lowrey Ave., Honolulu, Hawaii 96822

[22] Filed: Feb. 7, 1973

[21] Appl. No.: 330,216

[52] U.S. Cl.................... 350/149, 356/33, 356/34
[51] Int. Cl............................................. G02f 1/24
[58] Field of Search.............................. 356/33–35; 350/285, 160, 149, 147, 157, 161

[56] References Cited
UNITED STATES PATENTS

| | | | |
|---|---|---|---|
| 2,966,673 | 12/1960 | Guernsey | 356/33 |
| 3,198,063 | 8/1965 | Redner | 356/34 |
| 3,343,105 | 9/1967 | Van Der Pauw | 310/8.7 |
| 3,562,414 | 2/1971 | Blum | 350/149 |

OTHER PUBLICATIONS

Yando, "A Solid–State Display Device" Proc. I.R.E., Vol. 50, No. 12, pp. 2445–2451.
Nethercot, "Light Modulator," I.B.M. Tech. Disclosure Bulletin, Vol. 6, No. 7, Dec. 1963, pp. 55, 56.

Primary Examiner—Ronald L. Wibert
Assistant Examiner—Michael J. Tokar
Attorney, Agent, or Firm—James C. Wray

[57] ABSTRACT

A symmetric stress-plate optical birefringence modulator is constructed of a circular or substantially circular shaped disc having first and second light transmitting faces extending perpendicularly around an optical transmission axis and having an edge connecting the faces with opposite edge portions being substantially equidistant from the optical axis to reduce and eliminate linear-circular conversion which produces spurious circular polarization in conventional birefringence modulators. The symmetric stress-plates of the present invention have one or more and usually four transducers at spaced opposite edge portions to vibrate the stress-plate and to produce the desired modulation. The stress-plate and the transducers are isolated from a mounting frame and from lugs and mounts extending from the frame by soft resilient rubber tube segments.

11 Claims, 7 Drawing Figures

SYMMETRIC BIREFRINGENCE MODULATOR

BACKGROUND OF THE INVENTION

When a light source is viewed through a pair of polarizers adjusted for extinction, that is with their passing axes crossed, and when a piece of glass of other normally isotropic transparent material is inserted between the polarizers, it is well known that strain in the material destroys the extinction. A pattern of light and dark appears, revealing strain contours. This is the Piezo-optical or photoelastic effect. Disclosures of much of the background material for this fact are found for example in the U.S. Pat. Office Class 350, subclasses 149, 150, 157 and 161.

It is known that in a material that is otherwise isotropic and uniform uniaxial strain along one direction makes the refractive index in that direction differ from the refractive index in a perpendicular direction when light is incident in a third perpendicular direction. This birefringence results as in a quarter-wave plate in a path difference or retardation between the $x$ and $y$ polarization components of a light beam which has passed through the material.

The long-standing use of the photoelastic effect is in detecting mechanical strain in transparent models. The converse application of producing optical retardation by wave plate action with applied stress is a more recent use of the effect. A block of glass, fused silica or similar substance may be stressed with a modest force such as by finger pressure or with a small C-clamp sufficiently to produce quarter-wave retardation at visible wave lengths in a match box-size block of almost any of the common optical materials.

A further step beyond the use of static stress is to make use of mechanical vibration or more specifically self-vibrations, that is standing sound waves set up in the block of material. Two advantages are accomplished. In many applications a natural advantage is obtained by working with the modulated rather than with a constant birefringence. By using a standing sound wave vibration only small forces are needed to sustain a desired amplitude of vibration. Thus birefringence is accomplished with extremely small forces.

Modulated birefringence plates are described in James C. Kemp "Piezo-Optical Birefringence Modulators: New Use for a Long-Known Effect," Journal of the Optical Society of America, Vol. 59, No. 8 (Part 1), pp. 950–954, August, 1969. Applications of the devices in circular polarization measurements are described in J. C. Kemp, J. B. Swedlund, R. E. Murphy, and R. D. Wolstencroft "Circuarly Polarized Visible Light from Jupiter," Nature, Vol. 231, No. 5299, pp. 169–170, May 21, 1971, and J. C. Kemp, R. D. Wolstencroft and J. B. Swedlund "NGC 1068, 3C 273, and Scorpius X-1: Circular Polarization Disputed," The Astrophysical Journal, 173:L113–L118, May 1, 1972.

SUMMARY OF THE INVENTION

The present invention is an improved version of a class of devices which are known as piezo-optical photo-elastic or stress-plate modulator devices.

The type of device most closely related to the present invention is that device which is based on the basic extentional bar-mode as described in the above cited Kemp publication.

That type of device has a limitation which is based on its asymmetry arising from the inequivalence of the $x$ and $y$ directions which are normal to the optical-transmission axis. The asymmetry results in a residual average birefringence oriented along the $x$ or $y$ direction. In sensitive measurements such as required in the measurement of circularly polarized light in astronomy the residual average birefringence distorts the results. The residual average birefringence along one of the directions results in a so-called linear-circular conversion which is the production of false or spurious circular polarization due to interaction of the linear polarization of the light beam with the residual component in the modular birefringence.

The present invention takes advantage of the lowest mode of tetragonal symmetry of extentional vibration in a disc. In the preferred embodiment, the disc is round, and foru linearly extensible transducers are positioned in quadrants around the cylindrical edge of the disc. The disc is vibrated at a natural frequency by driving the transducers. Opposite transducers oriented in one direction are driven concurrently, and opposite transducers oriented in a second perpendicular direction are driven out of phase with respect to the first pair of transducers.

In other embodiments of the invention, the disc may depart from circular shape while retaining symmetry. The driving transducers may be replaced in the circular disc or in modified discs by two opposite transducers or by one transducer coupled to an edge of the disc.

In one form of a mount which is convenient for holding the disc and transducers, lug elements are extended from a frame and the disc is positioned between the lug elements being isolated therefrom by soft resilient mounts. The transducers are in a like manner held on the frame with brackets and are isolated from the frame and brackets by soft rubber mounts.

The broad objective of the invention is accomplished by providing a stress-plate which is substantially symmetrical about an optical transmission axis and driving the stress-plate at a predetermined frequency. Another object of the invention is the provision of a circular stress-plate and transducer drive combination. Another object of the invention is the provision of a substantially symmetrical stress-plate with four transducers mounted on opposite edge portions along tetragonal axes and the driving of a pair of oppositely oriented transducers along one axis out of phase with respect to the driving of transducers in a perpendicularly intersecting axis.

Another object of the invention is the provision of a modified circular stress-plate with flattened surfaces at opposite edge portions on tetragonal axes.

These and other objects and features of the invention are apparent in the disclosure which includes the drawings and the foregoing and ongoing specifications with its claims.

DETAILED DESCRIPTION OF THE DRAWINGS

Figure 1:
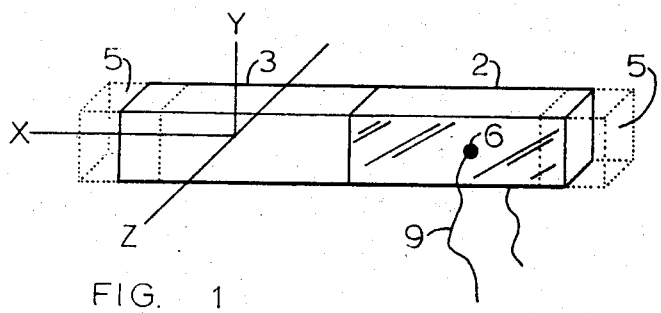
FIG. 1 is a perspective view of a prior art device which has a transducer coupled to the end of an elongated basic extentional bar-mode stress-plate.

Referring to FIG. 1, bar-shaped transducer 2 which operates in its fundamental extensional mode is shown connected to the one longitudinal end of a rectangular stress-plate 3. Dotted extensions 5 show exaggerated extensional vibrations of the transducer and stress-plate assembly. Wires 9 are shown soldered 6 to sides of the transducer. The stress-plate 3 of the prior art device has inequivalent vibrations along the $x$ axis which extends longitudinally through the plate and the 6 axis which extends transversally through the plate normal to the $z$ or optical-transmission axis.

Figure 2:
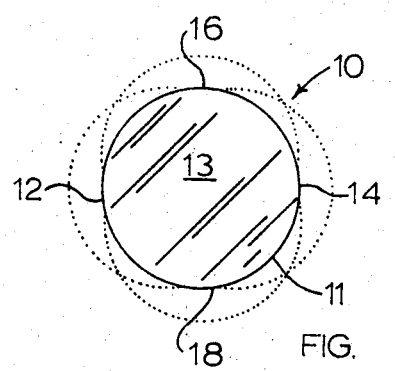
FIG. 2 is an elevation of a stress-plate constructed according to the present invention, showing vibrations in exaggerated dotted lines.

The preferred device of the present invention is shown in FIG. 2 where a circular stress-plate is generally indicated by the numeral 10. The stress-plate has a polished front face 13 and a similarly polished parallel rear face. The faces are interconnected by a cylindrical edge part 11. Points 12, 14, 16 and 18 may be coupled symmetrically to the ends of bar-shaped transducers which operate in their fundamental extensional mode such as shown in FIG. 1.

Figure 3:
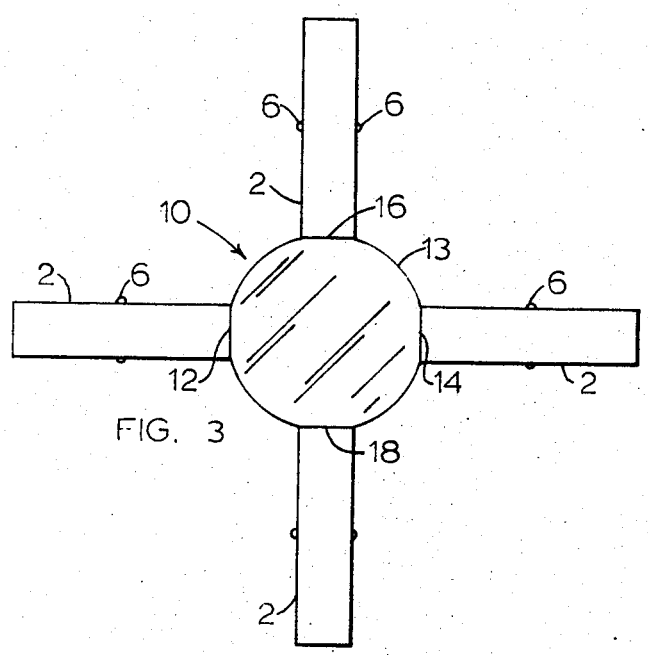
FIG. 3 is an elevation of a preferred embodiment of the invention in which transducers are mounted on tetragonal axes on flattened opposite edge portions of a circular stress-plate.
Figure 4:
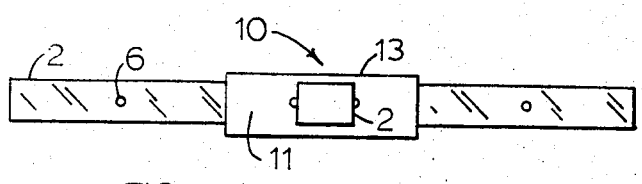
FIG. 4 is a side elevation of the apparatus shown in FIG. 3.

FIG. 3 shows such a circular stress-plate 10 which has been modified by flattening opposite edge portions 12, 14, 16 and 18 where the transducers are mounted. In the edge view of FIG. 4, it is seen that the thickness of the stress-plate 10 and edge means 11 need not be commensurate with the thickness of transducers 2. The transducers connected to points 12 and 14 are driven as a pair, and transducers connected to points 16 and 18 are driven out of phase with respect to the first pair so that the stress-plate 10 vibrates at a desired frequency.

In one example which has proved effective an optical element is constructed of an Optosil fused silica disc having a diameter of 2.000 inches and a thickness of 0.375 inch. Opposite edge portions are ground and flattened so that a distance between the flattened edge portions is 1.900 inches. Extensional mode vibrating transducers are mounted longitudinally on the flattened surfaces such as by an RTV silicone cement. The transducers have a length of 1.770 inches, a height of 0.340 inches and a thickness between plated electrode surfaces of 0.250. About ½ watt of electrical power is supplied to drive the transducers at a frequency of 56.65 KHz to achieve quarter-wave excitation at 5,000 A. Linear-circular conversion which produces spurious circular polarization indications is eliminated.

Figure 5:
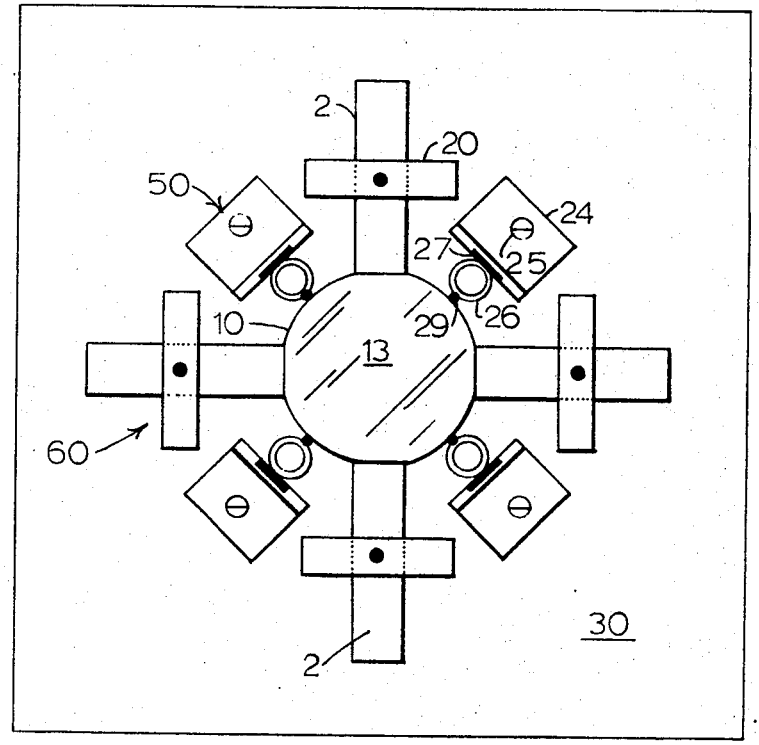
FIG. 5 is an elevational view of a stress-plate and transducer assembly such as shown in FIG. 3 and FIG. 4 being mounted for isolation with respect to a frame.

In one embodiment of a mount as shown in FIG. 5 a frame 30 has an opening which surrounds the stress-plate 10. Mounts which are generally indicated by the numeral 50 and as shown in further detail in FIG. 7 support the stress-plate 10 spaced from frame 30. Transducers mounts generally indicated by the numeral 60 and as shown in detail in FIG. 6 support the transducers.

Figure 6:
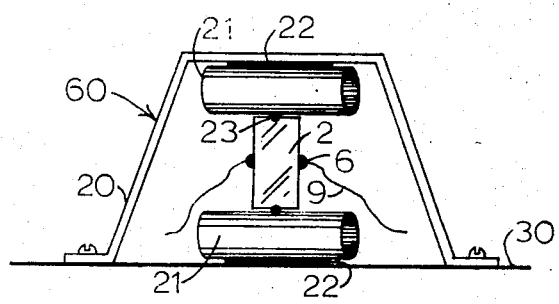
FIG. 6 is a detail of the transducer mounts shown in FIG. 5.

With reference to FIGS. 5 and 6, the transducer supports are comprised of inverted U-shaped mounts 20 which are attached to frame 30 with a convenient fastening means such as screws. Transducers 2 are isolated from frame 30 and from mounts 20 by soft rubber hoses 21 which may be fixed in place by lines of silicone cement 22 between the hoses 21 and fixtures 20 and 30 and dots 23 of silicone cement between the hoses 21 and the transducers 2.

Figure 7:
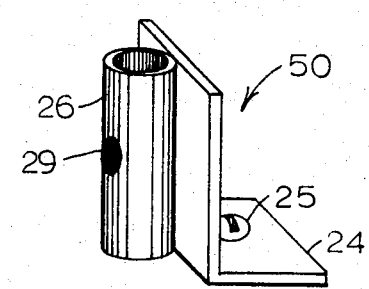
FIG. 7 is a detail of the stress-plate mounts shown in FIG. 5.

As shown in FIGS. 5 and 7, the stress-plate 10 is anchored in place by soft mounts generally indicated by the numeral 50. L-shaped lugs 24 are mounted to frame 30 by conveneint fastening means such as screws 25. Short pieces of soft rubber hose 26 are fastened to the upstanding legs of lugs 24 by a convenient means such as a coating 27 of silicone cement. Spots 29 of silicone cement connect the soft hose walls with edge wall points on the stress-plate.

A complete understanding of the theory and mechanics of operation is not necessary to the understanding of the present invention or to the carrying out of realizations of the invention.

An understanding of the shape and symmetry type of the vibrational mode which is excited in the optical element is useful in order to carry out successful realizations of the present invention. It is important that only a single, well-isolated mode be excited, of the proper type to produce a large, first-order piezo-optical effect in the central portion of the plate. In the prior art design (FIG. 1), this problem is of little import because the eigenmode employed (extensional bar mode) is well isolated from other modes and has a trivial one-dimensional geometry. In a plate of circular, square, or analogous shape however it tends to be the case that several modes can be excited, having frequencies comparable to that of a single desired mode. This circumstance can cause confusion in identifying the desired mode; and it can lead to deleterious effects due to cross coupling between adjacent modes.

The appropriate class of modes (of square, circular, or analogously shaped plates) for the present use in the class of face-dilational or contour modes. A general description of contour modes of square and circular plates is given by Richard Holland and E. P. Eer Nisse, Design of Resonant Piezoelectric Devices, Research Monograph No. 56, M. I. T. Press, Cambridge, Massachusetts (1969); and in various papers referred to in that book.

Of the above contour modes, only a subclass which we shall term "uniaxial" modes are of use for the present purpose. Those are modes in which a uniaxial stress is developed at the center of the plate. The uniaxial stress oscillates in direction between orthogonal $x$ and $y$ directions in the plane of the plate. In any plate having a symmetry which includes a fourfold rotation, i.e., a square, octagonal, circular, or analogous plate, the amplitudes of the alternating $x$-directed and $y$-directed stress at the center of the plate will be equal. An example is the lowest contour mode of a circular disc, shown in FIG. 2; the contour of the disc deforms into elliptical shapes, becoming longest along $x$ and $y$ directions, alternately, during respective half-cycles of the oscillation. (An example of a "non-uniaxial" contour mode of a circular disc would be a radially symmetric oscillation, in which the contour remains circular but oscillates in radius; such a mode would generate no birefringence in the center of the disc and would not be of use for the present purpose. For a square plate, the nature of the five lowest contour modes is shown in FIG. 3.4 of the above-mentioned book by Holland and Eer Nisse: in the upper section of that Figure, which pertains to square plates, the modes numbered 1, 2 and 5 are "uniaxial", while those numbered 3 and 4 are "non-uniaxial".)

An experimental study of the modes of plates appropriate for the symmetric birefringence modulator has been made. Of special interest is the so-called Lamé mode, which is of the uniaxial type referred to in the preceding paragraph, and is also normally the lowest-frequency contour mode. In a thin, circular disc of fused silica glass, the Lamé mode frequency was found to be lower than that of the next lowest, uniaxial type contour mode by a factor of 1.53. This is in fact the mode pictured in FIG. 2. In a square plate of fused silica, the corresponding factor was found to be 1.08. In the plate used in the model of FIGS. 3–7, having four flat edges cut on the perimeter of a circular disc (FIG. 3), the factor was found to be about 1.4, intermediate between that of the square and circular cases. The Lamé mode is thus well isolated in plates shaped as in FIG. 3. In tests on such plates, the observation was made that modes other than uniaxial-type contour modes, of frequencies within a factor of 2 of the Lamé mode frequency; these were generally identified as non-uniaxial contour modes and flexural modes. When a driving arrangement of proper symmetry is used, such extraneous modes cannot be excited. In the arrangement of FIG. 3, only uniaxial contour modes are excited if the "x-axis" pair of transducers is driven out of phase relative to the "y-axis" pair. That arrangement is thus appropriate for the Lamé mode, and the working model represented in FIGS. 3–7 operates in that mode.

Symmetry of the Modulator Optical-Element including Attachments and Mountings

In general, any symmetric modulator falling within the scope of the present claim will be defined by the property that it generates oscillating piezo-optical birefringences, of equal amplitudes, alternately along two mutually orthogonal axes in the plane normal to an optical transmitting axis through a plate or block. This will normally require that the optical plate itself have a certain degree of symmetry, i.e., that the symmetry group of the optical element include a fourfold axis parallel to the transmitting axis, as exemplified by the square, round and analogous plates referred to in the preceding section.

The attachments to the optical plate, including transducers, mountings, or loading stubs, must be such as not to appreciably disturb the fourfold symmetric character of the vibrating mode of the optical plate. This objective is most naturally accomplished by arranging all such attachments in such a way that the entire structure of the modulator assembly has the same fourfold symmetry, as exemplified by the design of FIGS. 3–7. However, this approach is not the only one. It is possible to use an asymmetric driving and/or support arrangement, which nevertheless does not appreciably disturb the fourfold symmetric character of the vibration of the optical element, as will be explained below; designs based on such an approach are also within the scope of the present invention.

Coupling of Transducers: Resonant vs. Non-Resonant Coupling; Symmetric vs. Asymmetric Coupling Coupling of piezo-electric transducers to a piezo-optical modulator element can be effected either through acoustically "hard" or "soft" bonds, as explained in an above-referenced review paper by the present applicant. With hard bonds, the optical element and transducers act as a single mechanical resonator, having vibrational modes and frequencies not necessarily the same as those of the separate component parts. If such bonds are used, the composite resonator composed of optical element plus transducers would vibrate in modes determined by the symmetry of the entire structure. A symmetric birefringence modulator based on this approach would of necessity have four (or a multiple of four) transducers, symmetrically disposed about the optical transmitting axis. An example would be the structure of FIG. 3, with hard bonds at the element-transducer contact points 12, 14, 16 and 18. (The actual model represented in FIGS. 3–7 however has soft bonds, as will be noted.)

The use of soft bonds is possible by virtue of the principle of sympathetic resonance. Each transducer is constructed so as to have an intrinsic vibration frequency which exactly matches that of the optical element. When that condition is met, and if the mechanical Q (inverse damping factor) of the optical element is very large, the bond between the element and transducer may be made very weak, just strong enough so that sufficient power is coupled to sustain the losses in the vibration. In this case the optical element vibrates essentially in a free mode, whose character (symmetry and shape) is sensibly independent of disposition or shape of the transducers. The latter for example may then consist of only a single transducer, coupled to the edge of the optical plate at only one region. In the structure of FIGS. 3–7, only one, two or three transducers need be used. However, even with the soft-bonded, resonant drive feature, it is still advantageous to use a symmetric arrangement: a very small departure from symmetric behavior, measured roughly by the factor 1/Q, can result from an asymmetric drive arrangement; and secondly, an arrangement such as in FIGS. 3–7 is more attractive from a constructional standpoint and simplifies the mounting scheme.

A general advantage of the soft bonding, resonant coupling scheme is that this scheme avoids the static stresses which are inevitably introduced into the optical element by hard bonding. Such stresses (caused by the contraction of the cement) propagate to some degree into the center of the optical element, causing a static, uniaxial birefringence which would defeat, to a certain extent, the basic objective of the present invention. In principle this effect could be minimized or cancelled; e.g., if, in the structure of FIG. 3, "hard" bonds were used at all four positions 12, 14, 16 and 18, and if the bonds were identical, symmetry would be restored and no static birefringence would exist at the center of the disc. In practice however, small uncontrollable differences would exist among the four bonds, and a residual effect would be produced. For this reason, soft bonding is preferred.

Mounting and Support Considerations

In general, mechanical support of the modulator assembly will be localized at nodal points or lines on the surface of the vibrating structure, following the principles well known in the technology of quartz crystal oscillators and related devices. The mountings must support the modulator in a well defined rest position, but must not: (a) introduce stresses which would disturb the desired symmetry of the vibrating mode; nor (b) seriously damp the mechanical vibration. In the realization of FIGS. 3–7, vibrational nodes exist at median positions, i.e., positions (6) in FIG. 3, along the bar-shaped, crystal quartz transducers. (The latter oscillate in the fundamental extensional mode in which no motion occurs at the center of the bar.) In the optical element, for the specific Lamé-type mode used in the model, nodes also exist at the four diagonal edge-points of the disc (positions 10, 13 and two opposing points in FIG. 3). Advantage is taken of all eight of these nodal regions in the mounting illustrated in FIGS. 5, 6 and 7, in order to evenly distribute the weight of the assembly. It is not required, of course, that all such nodes be utilized, nor even that the supports be symmetrically placed around the modulator; support could be effected for example only at the nodes of one opposing pair of transducers. The only criterion is that the symmetric vibration not be seriously disturbed.

The objective of allowing free symmetrical motion of the modulator can be further assured by making the mountings soft or flexible, as in the structure of FIGS. 3–7, in which soft rubber supports are used. "Hard" supports could be used, by rigidly bonding the modulator to knife edges or pivot points at the nodes; but that method would carry some danger of introducing asymmetric static stresses.

While the present invention has been described in part with reference to specific embodiments, the invention is not limited to those embodiments. It will be obvious to those skilled in the art that modifications and variations may be made without departing from the spirit and scope of the invention. The scope of the invention is precisely defined in the following claims.

I claim:

1. Optical resonant photoelastic birefringence modulator apparatus comprising a stress-plate constructed of an isotropic material and having first and second faces through which an optical-transmission axis centrally passes and having edge means surrounding the stress-plate and peripherally interconnecting the faces, the edge means being substantially uniformly spaced from the optical-transmission axis passing through the center of the faces, and oscillation producing transducer means connected to at least one portion of the edge means for stressing the stress-plate.

2. The optical birefringence apparatus of claim 1 wherein the stress-plate, the light transmitting faces and the edge means are substantially symmetrical in all directions perpendicular to the optical-transmission axis.

3. The optical birefringence apparatus of claim 2 wherein the light transmitting faces are susbstantially circular, and wherein the edge means is substantially cylindrical.

4. The optical birefringence apparatus of claim 3 wherein the cylindrical edge means is slightly flattened adjacent the oscillation producing transducer means.

5. The optical birefringence apparatus of claim 1 wherein the oscillation producing transducer means are mounted on opposite edge portions of the stress-plate edge means.

6. The optical birefringence apparatus of claim 1 wherein the oscillation producing transducer means comprise four transducers, first and second transducers being mounted on opposite edge portions of the stress-plate edge means and third and fourth transducers being oppositely mounted on to the stress-plate edge means substantially perpendicular to the first and second transducers at spaced opposite portions of the edge means.

7. The optical birefringence apparatus of claim 6 wherein the first and second transducers are operated out of phase with the third and fourth transducers.

8. The optical birefringence apparatus of claim 1 further comprising a frame means having an opening spaced outward from the edge means positioned around the stress-plate, lugs extending from the frame parallel to the edge means of the stress-plate and soft resilient tubes having walls oriented parallel to the edge means and having opposite portions of walls connected to the edge means of the stress-plate and connected to the lugs whereby the stress-plate is isolated from the lugs and frame.

9. The apparatus of claim 7 wherein the transducer means comprises an elongated block having one longitudinal end attached to a portion of the stress-plate edge means and further comprising a mount extending outward from the frame and first and second soft resilient pieces mounted on opposite sides of the transducer between the mount and the frame for isolating the transducer from the frame.

10. The optical birefringence apparatus of claim 1 further comprising a polarizer plate spaced from the first face along the optical axis and an analyzer plate positioned on the optical axis and spaced from the second face the polarizer and analyzer being rotated about the optical transmission axis with passing axes crossed and adjusted for extinction whereby stressing the plate with the transducer means vibrates the isotropic material and periodically destroys the extinction.

11. The optical resonant photoelastic birefringence modulator apparatus of claim 1 further comprising isolative mounting means connected to the stress-plate and configured for connecting to a frame for permitting free vibration of the stress-plate.

* * * * *